United States Patent
Kim

(10) Patent No.: US 8,493,523 B2
(45) Date of Patent: Jul. 23, 2013

(54) LIQUID CRYSTAL DISPLAY WITH TWO SUB-PIXEL REGIONS AND A STORAGE CAPACITOR

(75) Inventor: Jae-Hyun Kim, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 169 days.

(21) Appl. No.: 12/717,861

(22) Filed: Mar. 4, 2010

(65) Prior Publication Data

US 2011/0085102 A1 Apr. 14, 2011

(30) Foreign Application Priority Data

Oct. 9, 2009 (KR) .................. 10-2009-0096110

(51) Int. Cl.
*G02F 1/1343* (2006.01)
*G02F 1/136* (2006.01)

(52) U.S. Cl.
USPC .............. 349/39; 349/42; 349/43; 349/139; 349/144

(58) Field of Classification Search
USPC ................... 349/39, 42–43, 139, 144
See application file for complete search history.

(56) References Cited

U.S. PATENT DOCUMENTS

| | | | | |
|---|---|---|---|---|
| 5,434,685 | A * | 7/1995 | Pirs et al. ................ | 349/88 |
| 6,195,140 | B1 * | 2/2001 | Kubo et al. ............... | 349/44 |
| 7,821,603 | B2 | 10/2010 | Takeda et al. | |
| 2005/0105023 | A1 * | 5/2005 | Kim et al. ................ | 349/114 |
| 2007/0109467 | A1 * | 5/2007 | Chang et al. ............. | 349/106 |
| 2008/0030636 | A1 | 2/2008 | Huang et al. | |

FOREIGN PATENT DOCUMENTS

| | | |
|---|---|---|
| JP | 2000-002889 | 1/2000 |
| JP | 2007-264443 | * 10/2007 |
| KR | 1999-006951 | 1/1999 |
| KR | 10-1999-0014250 | 2/1999 |
| KR | 10-0457365 B1 | 11/2004 |
| KR | 10-2006-0001028 | 1/2006 |
| KR | 10-2007-0015982 | 2/2007 |
| KR | 1020070104082 A | 10/2007 |
| KR | 10-2008-0025544 | 3/2008 |
| KR | 10-2008-0086730 | 9/2008 |
| KR | 1020090060756 A | 6/2009 |

OTHER PUBLICATIONS

KIPO Office action dated Mar. 17, 2011, for Korean Patent application 10-2009-0096109.

(Continued)

*Primary Examiner* — Lauren Nguyen
(74) *Attorney, Agent, or Firm* — Christie, Parker & Hale, LLP

(57) ABSTRACT

In a high-resolution liquid crystal display with improved side visibility having a color filter on array, a unit pixel includes first and second sub-pixels in which liquid crystals are continuously aligned and electrically isolated. A first pixel electrode for implementing the first sub-pixel is formed on a color filter layer and a second protective layer, and a second pixel electrode for implementing the second sub-pixel is formed between the color filter layer and the second protective layer. The second protective layer the second protective layer formed on the second pixel electrode lowers the electric field of the second sub-pixel, so that a liquid crystal application voltage applied to the second sub-pixel is lower than the voltage applied to the first sub-pixel. Accordingly, the transmittances of the first and second sub-pixels in the unit pixel are different from each other, to improve side visibility.

9 Claims, 4 Drawing Sheets

OTHER PUBLICATIONS

KIPO Office action dated Mar. 18, 2011, for Korean Patent application 10-2009-0098183.

Office action received in corresponding Korean Patent Application No. 10-2009-0096110, dated Nov. 30, 2011, 1pg.

KIPO Office action dated Nov. 30, 2011, for Korean Patent application 10-2009-0096109, 1 page.

Korean Patent Abstracts, Publication No. 1020010085598, dated Sep. 7, 2001, corresponding to Korean Patent 10-0457365.

U.S. Office action dated Sep. 4, 2012, for cross reference U.S. Appl. No. 12/695,059, (15 pages).

* cited by examiner

LIQUID CRYSTAL DISPLAY WITH TWO SUB-PIXEL REGIONS AND A STORAGE CAPACITOR

CROSS-REFERENCE TO RELATED APPLICATION

This application claims priority to and the benefit of Korean Patent Application No. 10-2009-0096110, filed on Oct. 9, 2009, in the Korean Intellectual Property Office, the entire content of which is incorporated herein by reference.

BACKGROUND

1. Field

Non-limiting example embodiments of the present invention relates to a liquid crystal display (LCD) and a method of manufacturing the same, and more particularly, to an LCD which is an electric device of changing various types of electrical information generated from various devices into visual information through a change in transmittance of liquid crystals by applying a voltage thereto and displaying the visual information, and a method of manufacturing the LCD.

2. Description of Related Art

In general, a liquid crystal display (LCD) is a display that displays images by controlling transmittance of light incident from a light source, using the optical anisotropy of liquid crystal molecules and the polarization property of a polarizing plate. Because of light, thin, high-resolution and large-size characteristics of LCDs, their application fields have been rapidly extended.

However, since images are displayed by transmitting light only to the light transmission axis of liquid crystal molecules, such LCDs have a narrower viewing angle that those of other displays.

Therefore, various technologies for improving the viewing angle have been developed such as, a patterned vertical alignment (PVA) mode. In the PVA mode, liquid crystal molecules are aligned vertically to upper and lower substrates, and cut-away patterns are formed at a pixel electrode and a common electrode opposite to the pixel electrode, respectively. Therefore, a plurality of multi domains are formed by distorting the electric field formed between the two electrodes.

However, like the PVA mode LCD, a vertical alignment type LCD has lower side visibility than front visibility. For example, in a PVA mode LCD having cut-away portions, a gamma characteristic is seriously distorted as viewed further away from the center to the front side, and in the worst case, the difference in luminance between high grayscales disappears. Therefore, the image may get distorted.

To solve such a problem, a method has been proposed in which, one pixel is divided into two sub-pixels, and a total storage capacitance is graded so that a high voltage is applied to a sub-pixel having a large storage capacitance and a low voltage is applied to a sub-pixel having a small storage capacitance, resulting in different transmittances.

However, when this method of dividing one unit pixel into two sub-pixels is applied to a high-resolution (e.g., 250 PPI or higher) LCD, the aperture ratio is considerably lowered. Therefore, it is difficult to practically apply the method to the high resolution LCD.

SUMMARY

In some non-limiting example embodiments, the present invention is a vertical-alignment liquid crystal display (LCD) having a color filter on array (COA) structure, which may have an improved side visibility without lowering an aperture ratio.

According to some non-limiting example embodiments of the present invention, an LCD includes a unit pixel defined by gate lines and data lines overlapping with the gate lines, a thin film transistor in the unit pixel, a storage electrode electrically coupled to a drain electrode of the thin film transistor, the storage electrode being formed in a region of the unit pixel, a first protective layer and a color filter layer in the region of the unit pixel having the storage electrode, the first protective layer and the color filter having a contact hole in a region overlapping with the storage electrode, a second pixel electrode in a second region of the unit pixel on one side of the contact hole, the second pixel electrode implementing a second sub-pixel, a second protective layer formed on the region of the unit pixel, except the region in which the contact hole is formed, and a first pixel electrode on an upper portion of the second protective layer in a first region of the unit pixel excluding the second region and the region in which the contact hole is formed, the first pixel electrode implementing a first sub-pixel.

The LCD may further include a storage line extending in a first direction to extend through the unit pixel. The storage line may be formed in the same layer together with the gate lines.

In some non-limiting example embodiments, end portions of the first and second pixel electrodes overlap with each other at a predetermined interval, and the position at which the first and second pixel electrodes overlap with each other is an upper region of the storage line.

In some non-limiting example embodiments, the storage electrode is formed in the same layer together with the data lines, and the first and second pixel electrodes are electrically connected to the storage electrode through the contact hole.

The second protective layer may be formed using a silicon nitride or silicon oxide.

In some non-limiting example embodiments, the contact hole is formed at a central portion or a portion except the central portion based on the area ratio of the first and second pixel electrodes, and operations of liquid crystal molecules are controlled using an anchoring force of liquid crystals located in the contact hole.

According to some non-limiting example embodiments of the present invention, a method of manufacturing an LCD having a plurality of unit pixels defined by gate lines and data lines overlapping with the gate lines is provided. The method includes sequentially forming a first protective layer and a color filter layer on a transparent substrate on which, a thin film transistor and a storage electrode are formed for each of the unit pixels, forming a contact hole in a region of the first protective layer and the color filter layer overlapping with the storage electrode so that the storage electrode is exposed, forming a second pixel electrode in a second region of the unit pixel on one side of the contact hole, forming a second protective layer on a region of the unit pixel except the region in which the contact hole is formed, and forming a first pixel electrode on an upper portion of the second protective layer in a first region of the unit pixel excluding the second region and the region in which the contact hole is formed.

According to some non-limiting example embodiments of the present invention, a method of manufacturing an LCD having a plurality of unit pixels defined by gate lines and data lines overlapping with the gate lines is provided. The method includes sequentially forming a first protective layer and a color filter layer on a transparent substrate on which, a thin film transistor and a storage electrode are formed for each of the unit pixels, forming a second sub-pixel on a second region of the unit pixels including a second pixel electrode, forming a first sub-pixel on a first region of the unit pixels excluding the second region, the first sub-pixel including a first pixel electrode, and forming a contact hole in a third region of the unit pixels excluding the first and second regions, wherein the first and second pixel electrodes are electrically connected to the storage electrode via the contact hole.

According to non-limiting example embodiments of the present invention, when a unit pixel is divided into first and second sub-pixels, the first and second sub-pixels are not electrically isolated from each other, but a protective layer is formed on a second pixel electrode for implementing the second sub-pixel, so that the electric field of the second sub-pixel is lowered. Therefore, a liquid crystal application voltage applied to the second sub-pixel is lower than that applied to the first sub-pixel. Accordingly, a vertical-alignment LCD having a color filter on array (COA) structure may have an improved side visibility without lowering an aperture ratio.

BRIEF DESCRIPTION OF THE DRAWINGS

The accompanying drawings, together with the specification, illustrate non-limiting example embodiments of the present invention, and, together with the description, serve to explain the principles of the present invention.

DETAILED DESCRIPTION

Figure 1:
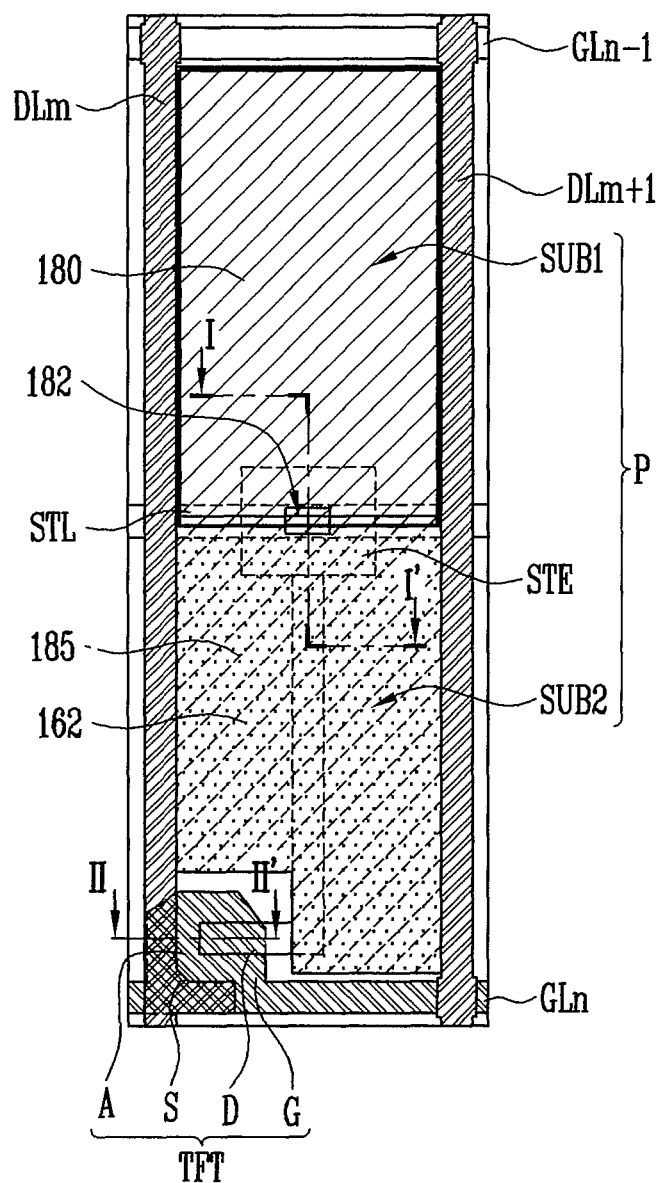
FIG. 1 is a plan view illustrating a unit pixel of a liquid crystal display (LCD) according some non-limiting example embodiments of the present invention.

In the following detailed description, only certain non-limiting example embodiments of the present invention have been shown and described, simply by way of illustration. As those skilled in the art would realize, the described non-limiting example embodiments may be modified in various different ways, all without departing from the spirit or scope of the present invention. Accordingly, the drawings and description are to be regarded as illustrative in nature and not restrictive. In addition, when an element is referred to as being "on" another element, it may be directly on the other element or be indirectly on the other element with one or more intervening elements interposed therebetween. Also, when an element is referred to as being "connected to" another element, it may be directly connected to the other element or be indirectly connected to the other element with one or more intervening elements interposed therebetween. Hereinafter, like reference numerals refer to like elements.

Figure 2A:
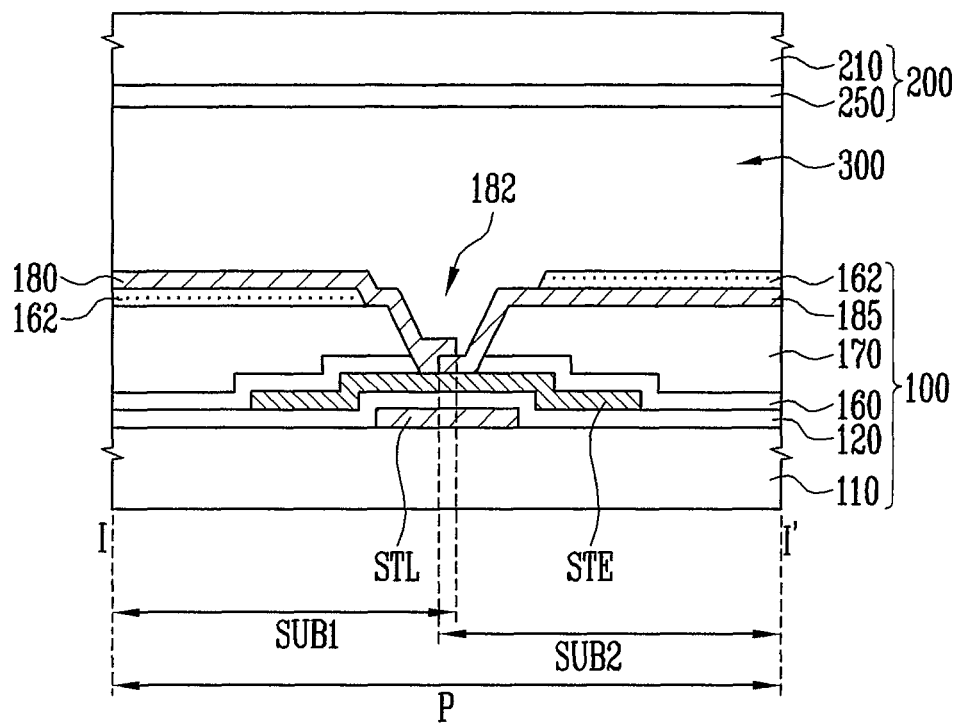
FIGS. 2A and 2B are sectional views taken along lines I-I' and II-II' of FIG. 1, respectively.
Figure 2B:
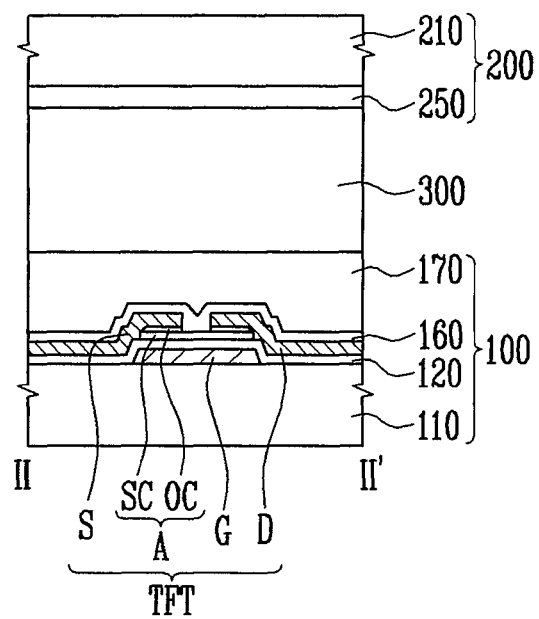

FIG. 1 is a plan view illustrating a unit pixel of a liquid crystal display (LCD) according to some non-limiting example embodiments of the present invention. FIGS. 2A and 2B are sectional views taken along lines I-I' and II-II' of FIG. 1, respectively.

Specifically, FIG. 2A is a sectional view illustrating a region including a storage line passing through the unit pixel, and FIG. 2B is a sectional view illustrating a region at which a thin film transistor is formed in the unit pixel.

Referring to FIGS. 1, 2A and 2B, the LCD may include a first substrate 100, a second substrate 200 and a liquid crystal layer 300 located between the first and second substrates 100 and 200.

The LCD 400 according to the non-limiting example embodiment of the present invention may be an LCD having a color filter on array (COA) structure, in which a color filter is formed on the first substrate 100.

Accordingly, the first substrate 100 may include a transparent substrate 110, gate lines GLn−1, GLn, . . . , data lines DLm, DLm+1, . . . , a thin film transistor TFT, a first protective layer 160, a second protective layer 162, a color filter layer 170, first and second pixel electrodes 180 and 185, a storage line STL, and a storage capacitor Cst (not explicitly shown) formed by a storage electrode STE.

The gate lines GLn−1, GLn, . . . may extend in a first direction (X) on the transparent substrate 110. The gate lines GLn−1, GLn, . . . may be first metal patterns formed by patterning a first metal layer.

A gate insulating layer 120 may be formed on the transparent substrate 110 having the gate lines GLn−1, GLn, . . . formed thereon. The gate insulating layer 120 may include a silicon nitride (SiNx), for example.

The data lines DLm, DLm+1, . . . extending in a second direction (Y) substantially perpendicular to the first direction (X) may be formed on the gate insulating layer 120.

In some non-limiting example embodiments, the data lines DLm, DLm+1, . . . may be second metal patterns formed by patterning a second metal layer. Unit pixels P arranged in a matrix form may be defined by intersecting the data lines DLm, DLm+1, . . . and the gate lines GLn−1, GLn, . . . on the transparent substrate 110.

Hereinafter, a unit pixel P defined by overlap of an n-th gate line GLn and an m-th data line DLm will be described in detail.

The unit pixel P may include a thin film transistor TFT, a first protective layer 160, a second protective layer 162, a color filter layer 170, first and second pixel electrodes 180 and 185, a storage line STL and a storage electrode STE.

The thin film transistor TFT may be formed at an intersection portion of the n-th gate line GLn and the m-th data line DLm, and may include a gate electrode G, an active layer A, a source electrode S and a drain electrode D.

The gate electrode G may be a first metal pattern protruding from the n-th gate line GLn. The gate insulating layer 120 may be formed on the gate electrode G, and the active layer A overlapping with the gate electrode G may be formed on the gate insulating layer 120.

The active layer A may be formed into a structure in which a semiconductor layer SC and an ohmic contact layer OC may be stacked. For example, in some non-limiting example embodiments, the semiconductor layer SC may be formed using an amorphous silicon (a-Si:H), and the ohmic contact layer may be formed using an amorphous silicon (n+ a-Si:H) highly doped with an n-type impurity.

The source and drain electrodes S and D formed using a second metal pattern substantially the same as that of the data lines DLm, DLm+1, . . . may be formed on the active layer A.

The source electrode S may protrude from the m-th data line DLm and may partially overlap with the active layer A. The drain electrode D may be formed to be spaced apart from the source electrode S at a predetermined interval, and may partially overlap with the active layer A.

Subsequently, the ohmic contact layer OC may be removed in the spacing portion of the source and drain electrodes S and D, and the semiconductor layer SC may be exposed.

The thin film transistor TFT may be a switching element that may apply a data voltage to the pixel electrode 180 in response to a timing signal applied from the gate electrode G.

In the non-limiting example embodiment illustrated in FIGS. 1 and 2, a thin film transistor TFT provided to each of the unit pixels P may be formed into a bottom gate structure in which an active layer may be formed using amorphous silicon. However, the present invention is not limited thereto. That is, the thin film transistor TFT may be formed into a top gate structure in which the active layer may be formed using crystalline silicon.

As illustrated in FIG. 2A, the first and second pixel electrodes 180 and 185 may be formed in a region of the unit pixel P defined by the gate and data lines. The first and second pixel electrodes 180 and 185 may be electrically connected to the storage electrode STE through a contact hole 182 formed in one region of the unit pixel P overlapping with the storage line STL.

In the non-limiting example embodiment of the present invention, the first and second pixel electrodes 180 and 185 may be formed in two regions into which the region of the unit pixel P may be cut through different processes, respectively. Accordingly, the unit pixel P may include a first sub-pixel SUB1 implemented by the first pixel electrode 180 and a second sub-pixel SUB2 implemented by the second pixel electrode 185.

Also, both of the first and second pixel electrodes 180 and 185 may be electrically connected to the storage electrode STE through the contact hole 182, and the storage electrode STE may be electrically connected to the drain electrode D of the thin film transistor TFT. Therefore, the same data voltage may be applied to the first and second pixel electrodes 180 and 185 constituting the unit pixel P.

Here, the contact hole 182 may be formed at a central portion or a portion except the central portion based on the area ratio of the first pixel electrode 180 to the second pixel electrode 185. The area ratio of the first pixel electrode 180 to the second pixel electrode 185 may be about 1:3 to about 1:2 according to some non-limiting example embodiments of the present invention.

However, when the first and second pixel electrodes 180 and 185 may be electrically connected to the storage electrode STE through the contact hole 182, end portions of the first and second pixel electrodes 180 and 185 may overlap with each other at a predetermined interval, as illustrated in FIG. 2A. In this case, the position at which the first and second pixel electrodes 180 and 185 overlap with each other becomes an upper region of the storage line STL.

As illustrated in FIG. 1, the storage electrode STE may be formed in a region overlapping with the storage line STL in the unit pixel. The storage electrode STE may be formed in the same layer together with the drain electrode D of the thin film transistor TFT and electrically connected to the drain electrode D. For example, the storage electrode STE and the drain electrode D may be formed using the same metallic material. However, the present invention is not necessarily limited thereto.

The storage line STL may be formed in the same layer together with the gate lines GLn−1, GLn, . . . , and extend in the first direction (X) to pass through the unit pixel P, as illustrated in FIG. 1. Here, the storage line STL and the gate lines may be formed using the same metallic material. However, the present invention is not necessarily limited thereto.

The storage electrode STE may be a metal pattern electrically connected to the drain electrode D. The storage electrode STE may overlap with the storage line STL in each of the unit pixels P to form storage capacitance of each of the unit pixels P.

That is, the storage electrode STE and the storage line STL may overlap with each other with the gate insulating layer 120 located between the storage electrode STE and the storage line STL to form a storage capacitor Cst charged with a data voltage during one frame.

Also, the first protective layer 160 and the color filter layer 170 may be sequentially formed on the transparent substrate 110 on which the thin film transistor TFT and the storage capacitor Cst are formed. As described above, the contact hole 182 may be formed in the region of the first protective layer 160 and the color filter layer 170, corresponding to the central portion of the unit pixel P, so that the storage electrode STE may be exposed.

In some non-limiting example embodiments, the first protective layer 160 may be formed using a silicon nitride (SiNx), for example. The color filter layer 170 may be formed using photosensitive organic materials respectively realizing red (R), green (G) and blue (B) colors for each of the unit pixels P. The color filter layer 170 may be formed by repeating color filters having the colors for each of the unit pixels P. Therefore, the color filter layer 170 may function to provide a color to light that may be incident from a light source and then advance through the liquid crystal layer.

Then, when the storage electrode STE may be exposed by the contact hole 182 formed in the color filter layer 170 and the first protective layer 160, the second pixel electrode 185 may be formed in a region of the unit pixel P on one side of the contact hole 182.

The second protective layer 162 may be formed on the entire region of the unit pixel P except the region of the contact hole 182, i.e., an upper portion of the second pixel electrode 185 and the region of the unit pixel P except the second pixel electrode 185.

In some non-limiting example embodiments, the second protective layer 162 may be formed using a silicon nitride (SiNx) or silicon oxide ($SiO_2$).

Furthermore, the first pixel electrode 180 may be formed on the upper portion of the second protective layer 162 formed on the region of the unit pixel P except the second pixel electrode 185 and the other region of the contact hole 182.

That is, the unit pixel P may include a first sub-pixel SUB1 where the first pixel electrode 180 is formed and a second sub-pixel SUB2 where the second pixel electrode 185 is formed. The first and second pixel electrodes 180 and 185 may be electrically connected to the storage electrode STE through the contact hole 182.

However, the unit pixel P may have a structure in which the second protective layer 162 may be formed on an upper region of the second pixel electrode 185. At this time, the second protective layer 162 may be lower the electric field of the second sub-pixel SUB2 so that the liquid crystal application voltage applied to the region of the second sub-pixel SUB2 may be lower than that applied to the region of the first sub-pixel SUB1 with respect to the data voltage uniformly applied to the unit pixels P.

In some non-limiting example embodiments, the first and second pixel electrodes 180 and 185 may be formed using a transparent conductive material. For example, the first and second pixel electrodes 180 and 185 may be formed using indium tin oxide (ITO), indium zinc oxide (IZO), or the like.

A common electrode 250 may be formed on the second substrate 200 in surface contact with the first substrate 100 and substantially opposite to the first and second pixel electrodes 180 and 185.

In the non-limiting example embodiments of the present invention, since the color filter layer 170 may be formed on the first substrate, forming color filters on the second substrate may not be required. Accordingly, a black matrix formed between the color filters and an overcoat layer for planarizing the surface having the color filters and the black matrix may not be required.

In some non-limiting example embodiments, the common electrode 250 may be formed using a transparent conductive material. For example, the common electrode 250 may be formed using ITO, IZO or the like.

Moreover, a contact hole (not shown) may be formed in the region corresponding to the contact hole 182 formed in the unit pixel P on the first substrate 100.

The storage line STL and the storage electrode STE may be necessarily formed in the unit pixel P to form a storage capacitor Cst charged with the data voltage. However, when the storage line STL and the storage electrode STE may be formed by an opaque metallic material, the storage line STL and the storage electrode STE may shield light, thereby resulting in a low aperture ratio of the unit pixel P.

When the LCD may be driven, liquid crystal molecules may be aligned at an angle at which light may not be emitted by allowing the liquid crystal molecules to collide each other in a region corresponding to the contact hole 182, and hence a singular point may be formed, at which light may not be emitted. Therefore, the contact hole 182 may be a factor that may cause the aperture ratio of the unit pixel P to be lowered.

Accordingly, the storage line STL, the storage electrode STE and the contact hole 182, which may be factors that may cause the aperture of the unit pixel P to be lowered, may be formed to overlap with one another, so that preventing the aperture ratio of the unit pixel P from being lowered by the factors may be achieved.

In the non-limiting example embodiment of the present invention, the storage line STL and the storage electrode STE, forming the storage capacitor Cst, may be formed using a transparent conductive material, thereby preventing the lowering of the aperture ratio.

Figure 3:
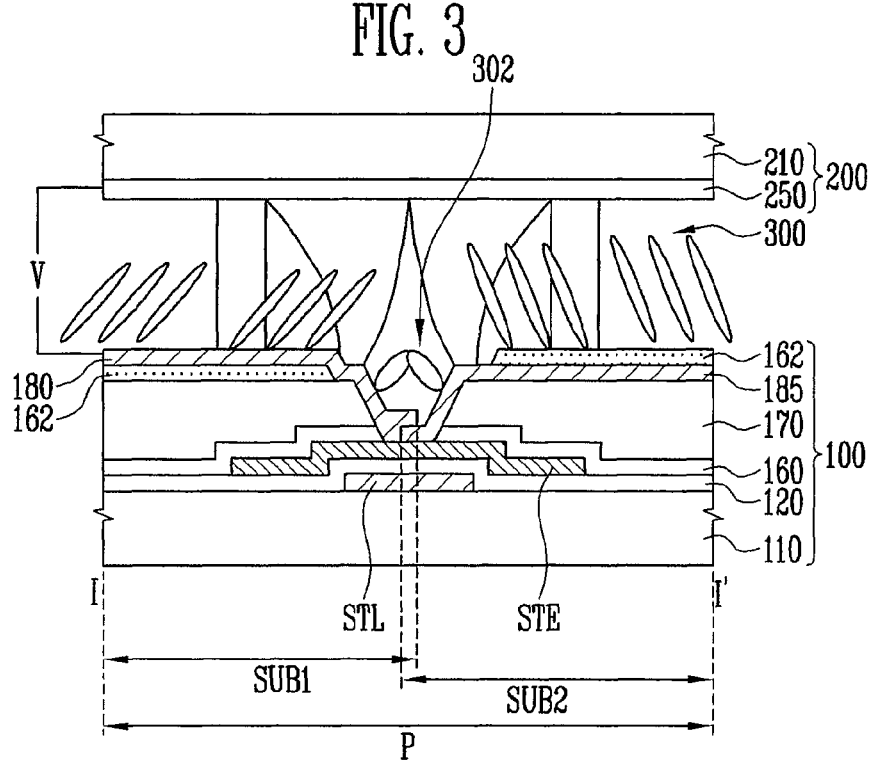
FIG. 3 is a sectional view conceptually illustrating the driving of the LCD illustrated in FIG. 1.

FIG. 3 is a sectional view conceptually illustrating a driving of the LCD illustrated in FIG. 1. Here, the driving of the LCD will be described using the sectional region of FIG. 2A.

Referring to FIG. 3, when no voltage is applied to the first and second pixel electrodes 180 and 185 and the common electrode 250, an electric field may not be formed between the first and second substrates 100 and 200. In this case, liquid crystal molecules in the liquid crystal layer 300 may be in a vertical alignment state. Therefore, although light is provided from the rear of the LCD panel, the light may not advance through the liquid crystal layer 300.

On the other hand, when a voltage V is applied to the first and second pixel electrodes 180 and 185 and the common electrode 250, electric field lines may be formed in a substantially diagonal direction in the vicinity of the contact hole 182, and liquid crystal molecules adjacent to the electric field lines rapidly respond first. Accordingly, the liquid crystal molecules are realigned in a direction substantially vertical or substantially parallel to the electric field lines in the vicinity of the contact hole 182, so that light may advance through the liquid crystal layer 300.

That is, the LCD according to the non-limiting example embodiment of the present invention may control operations of liquid crystal molecules using an anchoring force of liquid crystals 302 located in the contact hole 182 formed at the central portion of the unit pixel P.

In some non-limiting example embodiments, polymer stabilized liquid crystals (PSLCs) may be applied to improve a liquid crystal control force and response speed and bruising properties in the contact hole 182.

Similarly, as illustrated in FIG. 3, electric field lines may also be formed in a substantially diagonal direction in an edge region of the unit pixel P, and liquid crystal molecules adjacent to the electric field lines rapidly respond first. Accordingly, the liquid crystal molecules may be realigned in a direction substantially vertical or substantially parallel to the electric field lines in the edge region of the unit pixel P, so that light may advance through the liquid crystal layer 300.

However, liquid crystal molecules located in a middle area between the contact hole 182 and the edge region may not be substantially influenced by the electric field lines, and therefore, a response speed may be lowered, thereby resulting in lowering of side visibility.

In the non-limiting example embodiment of the present invention, to solve such a problem, the second protective layer 162 may be formed in an upper region of the second pixel electrode 185 with respect to the region of the second sub-pixel SUB2, as illustrated in FIG. 3. Thus, the second protective layer 162 may serve as an electric-field reducing layer. Accordingly, the unit pixel P, divided into the two sub-pixels SUB1 and SUB2, may be driven by respectively applying transmittances to the two sub-pixels SUB1 and SUB2, so that preventing side visibility from being lowered may be achieved.

In the related art, when the unit pixel P is divided into a plurality of sub-pixels, individual thin film transistors and storage capacitors are respectively used in the sub-pixels by electrically isolating the sub-pixels from one another. However, in the non-limiting example embodiment of the present invention, the first and second sub-pixels SUB1 and SUB2 may be electrically connected to each other, and the same thin film transistor TFT and storage capacitor Cst are used in or shared by the first and second sub-pixels SUB1 and SUB2.

Accordingly, in the non-limiting example embodiment of the present invention, a high-resolution (e.g., 250 PPI or higher) LCD may have an improved side visibility without lowering an aperture ratio.

More specifically, although a data voltage substantially the same as that applied to the first sub-pixel SUB1 formed beneath the first pixel electrode 180 may be applied to the second protective layer 162 formed on the second pixel electrode 185, the second protective layer 162 may serve as a dielectric substance added to a liquid crystal capacitor. Therefore, the liquid crystal application voltage applied to the second sub-pixel SUB2 may be lower than that of the first sub-pixel SUB1.

As described above, as the liquid crystal application voltages of the first and second sub-pixels SUB1 and SUB2 may be substantially different in the same data signal, the liquid crystals are aligned so that the light may be transmitted in various directions, thereby improving side visibility.

That is, in the non-limiting example embodiment of the present invention, the unit pixel P may include first and second sub-pixels SUB1 and SUB2 in which liquid crystals may be continuously aligned without being electrically isolated, and the second protective layer 162 may be formed on the second pixel electrode 185 for implementing the second sub-pixel SUB2, so that the liquid crystal application voltage applied to the region of the second sub-pixel SUB2 may be lower than that applied to the region of the first sub-pixel SUB1. Accordingly, the transmittances of the first and second sub-pixels SUB1 and SUB2 in the unit pixel P may be substantially different from each other, thereby improving side visibility.

FIGS. 4A to 4E are sectional views illustrating a method of manufacturing an LCD according to some non-limiting example embodiments of the present invention.

For convenience of illustration, a method of manufacturing the first substrate illustrated in FIG. 2A will be described with reference to the sectional views.

Figure 4A:
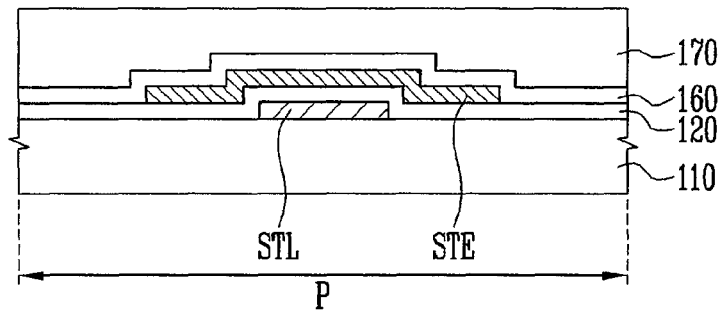
FIGS. 4A to 4E are sectional views illustrating a method of manufacturing an LCD according to a non-limiting example embodiment of the present invention.

Referring to FIG. 4A, a first protective layer 160 and a color filter layer 170 may be sequentially formed on a transparent substrate 110 on which a thin film transistor (not shown), a storage line STL, a gate insulating layer 120 and a storage electrode STE are formed.

In some non-limiting example embodiments, the first protective layer 160 may be formed using a silicon nitride (SiNx), and the color filter layer 170 may be formed using photosensitive organic materials respectively realizing red (R), green (G) and blue (B) colors for each unit pixel P. The color filter layer 170 may be formed by repeating color filters having the colors for each of the unit pixels P.

Figure 4B:
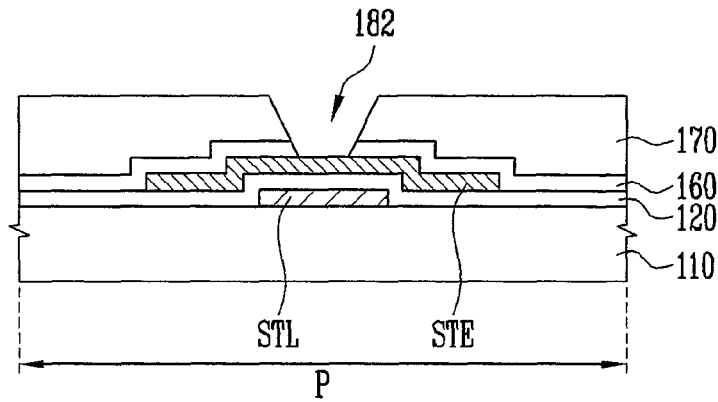

Referring to FIG. 4B, a contact hole 182 may be then formed in a region of the first protective layer 160 and the color filter layer 170, which overlaps with the storage electrode STE, so that the storage electrode STE may be exposed.

Figure 4C:
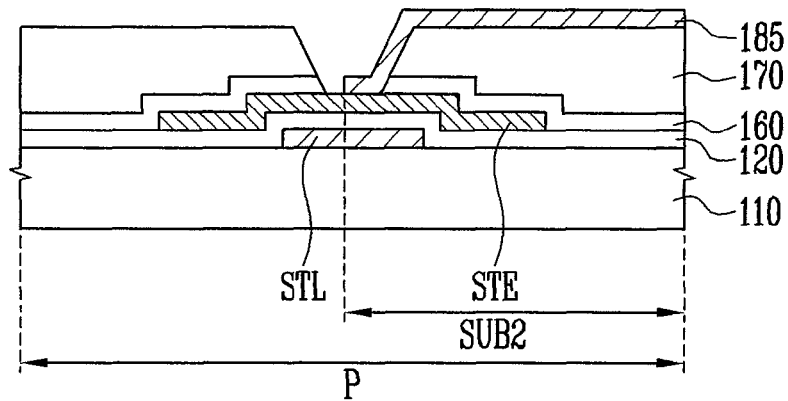

As illustrated in FIG. 4C, a second pixel electrode 185 may be then formed in one region of the unit pixel P having one side of the contact hole 182.

Figure 4D:
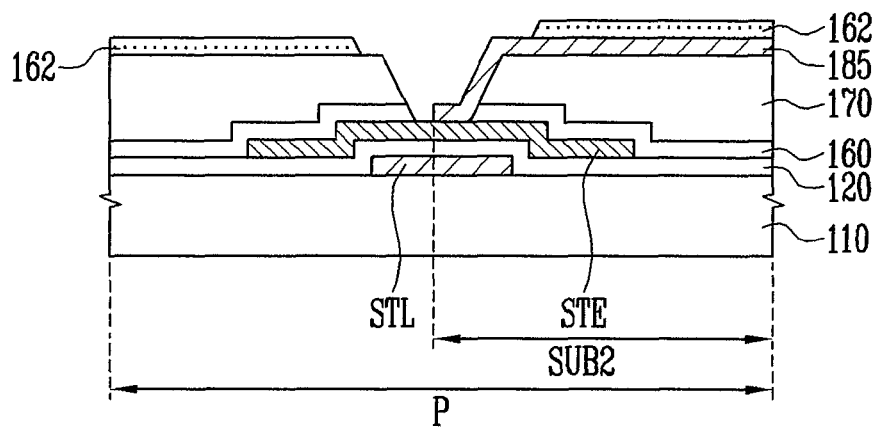

A second protective layer 162 may be then formed on a region of the unit pixel P except the region of the contact hole 182, i.e., an upper portion of the second pixel electrode 185 and the region of the unit pixel P except the second pixel electrode 185, as illustrated in FIG. 4D.

In some non-limiting example embodiments, the second protective layer 162 may be formed using a silicon nitride (SiNx) or silicon oxide ($SiO_2$).

Figure 4E:
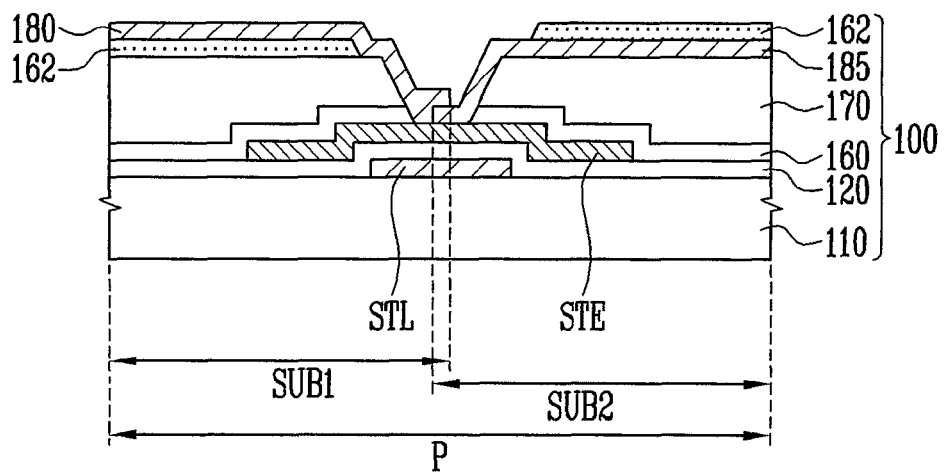

Referring to FIG. 4E, a first pixel electrode 180 may be then formed on the upper portion of the second protective layer 162 formed on the region of the unit pixel P except the second pixel electrode 185 and the other region of the contact hole 182.

That is, the unit pixel P may include a first sub-pixel SUB1 that is a region having the first pixel electrode 180 formed therein and a second sub-pixel SUB2 having the second pixel electrode 185 formed therein. The first and second pixel electrodes 180 and 185 may be electrically connected to a storage electrode STE through the contact hole 182.

Here, the unit pixel P may have a structure in which the second protective layer 162 may be formed on an upper region of the second pixel electrode 185. This way, the second protective layer 162 may lower the electric field of the second sub-pixel SUB2, so that the liquid crystal application voltage applied to the region of the second sub-pixel SUB2 may be lower than that applied to the region of the first sub-pixel SUB1 with respect to the data voltage uniformly applied to the unit pixels P.

However, when the first and second pixel electrodes 180 and 185 may be electrically connected to the storage electrode STE through the contact hole 182, end portions of the first and second pixel electrodes 180 and 185 may be formed to overlap with each other at a predetermined interval, as illustrated in FIG. 4E. In this case, the area where the first and second pixel electrodes 180 and 185 overlap may be located over the storage line STL.

In some non-limiting example embodiments, the first and second pixel electrodes 180 and 185 may be formed using a transparent conductive material. For example, the first and second pixel electrodes 180 and 185 may be formed using ITO, IZO, or the like.

While the present invention has been described in connection with certain non-limiting example embodiments, it is to be understood that the invention is not limited to the disclosed non-limiting example embodiments, but, on the contrary, is intended to cover various modifications and equivalent arrangements included within the spirit and scope of the appended claims, and equivalents thereof.

What is claimed is:

1. A liquid crystal display (LCD) comprising:
   gate lines and data lines intersecting with the gate lines;
   a thin film transistor in a unit pixel;
   a storage electrode electrically coupled to a drain electrode of the thin film transistor, the storage electrode being formed in a region of the unit pixel;
   a first protective layer and a color filter layer in the region of the unit pixel having the storage electrode, the first protective layer and the color filter having a contact hole in a region overlapping with the storage electrode;
   a second pixel electrode in a second region of the unit pixel on one side of the contact hole, the second pixel electrode implementing a second sub-pixel;
   a second protective layer on substantially an entire region of the unit pixel, except the region in which the contact hole is formed, the second protective layer being formed on top of the second pixel electrode, in the second region; and
   a first pixel electrode on an upper portion of the second protective layer formed in a first region of the unit pixel which excludes the second region and the region in which the contact hole is formed, the first pixel electrode implementing a first sub-pixel and covering substantially the entire second protective layer, wherein the contact hole is configured to electrically connect the first and second pixel electrodes to the storage electrode.

2. The LCD according to claim 1, further comprising a storage line extending in a first direction to extend through the unit pixel, wherein the storage line is formed in a same layer as the gate lines.

3. The LCD according to claim 2, wherein end portions of the first and second pixel electrodes overlap with each other at a predetermined interval.

4. The LCD according to claim 3, wherein a position at which the first and second pixel electrodes overlap with each other is an upper region of the storage line.

5. The LCD according to claim 1, wherein the storage electrode is in a same layer as the data lines.

6. The LCD according to claim 1, wherein the first and second pixel electrodes are electrically coupled to the storage electrode through the contact hole.

7. The LCD according to claim 1, wherein the second protective layer is a silicon nitride or silicon oxide.

8. The LCD according to claim 1, wherein the contact hole is a central portion or a portion except the central portion based on the area ratio of the first and second pixel electrodes, and configured in such a way that anchoring force of liquid crystals located in the contact hole is set to control operations of liquid crystal molecules.

9. The LCD according to claim 8, wherein the liquid crystals are polymer stabilized liquid crystals.

* * * * *